(12) United States Patent (10) Patent No.: US 8,393,292 B2
Yoshino et al. (45) Date of Patent: Mar. 12, 2013

(54) PAINTING SYSTEM

(75) Inventors: Katsuhiko Yoshino, Fukuoka (JP);
Shingi Takahashi, Fukuoka (JP)

(73) Assignees: Kabushiki Kaisha Yaskawa Denki,
Kitakyushu-Shi (JP); Honda Motor Co., Ltd., Tokyo (JP)

( * ) Notice: Subject to any disclaimer, the term of this patent is extended or adjusted under 35 U.S.C. 154(b) by 511 days.

(21) Appl. No.: 12/551,512

(22) Filed: Aug. 31, 2009

(65) Prior Publication Data

US 2009/0320753 A1 Dec. 31, 2009

Related U.S. Application Data

(63) Continuation of application No. PCT/JP2008/053942, filed on Mar. 5, 2008.

(30) Foreign Application Priority Data

Mar. 8, 2007 (JP) ................................. 2007-058231
Jul. 20, 2007 (JP) ................................. 2007-189428

(51) Int. Cl.
*B05C 5/02* (2006.01)

(52) U.S. Cl. ........... 118/326; 118/300; 118/323; 901/43

(58) Field of Classification Search .................. 118/300, 118/323, 326; 901/43; 427/421.1, 427.3, 427/424
See application file for complete search history.

(56) References Cited

U.S. PATENT DOCUMENTS 4,498,414 A * 2/1985 Kiba et al. ..................... 118/663
4,721,630 A * 1/1988 Takeo et al. .................... 427/236
2006/0040060 A1* 2/2006 Meissner ....................... 427/289
2006/0292308 A1 12/2006 Clifford et al.

FOREIGN PATENT DOCUMENTS

| EP | 1609532 | 12/2005 |
| GB | 2114024 | 8/1983 |
| JP | 62-087769 | 6/1987 |
| JP | 08-164349 | 6/1996 |
| JP | 2000-167451 | 6/2000 |
| WO | WO 01/68267 | 9/2001 |
| WO | WO 2005/046880 | 5/2005 |

OTHER PUBLICATIONS

Japanese Office Action for corresponding JP Application No. 2009-502606, Oct. 2, 2012.

* cited by examiner

*Primary Examiner* — Laura Edwards
(74) *Attorney, Agent, or Firm* — Ditthavong Mori & Steiner, P.C.

(57) ABSTRACT

A painting system includes a conveyor, a first travel guide rail, a second travel guide rail, a painting robot, and an opener robot. The conveyor is configured to convey in a paint booth an article to be painted. The first travel guide rail is provided at a side of the conveyor to extend along the conveyor. The second travel guide rail is provided at a side of the conveyor to extend along the conveyor above the first travel guide rail. The painting robot is mounted on the first travel guide rail to be movable along the first travel guide rail. The opener robot is mounted on the second travel guide rail to be movable along the second travel guide rail. The painting robot and the opener robot are movable along the first travel guide rail and the second travel guide rail respectively without interfering with each other.

5 Claims, 8 Drawing Sheets

PAINTING SYSTEM

CROSS-REFERENCE TO RELATED APPLICATIONS

This application is a continuation application of PCT/JP2008/053942, filed Mar. 5, 2008, which claims priority to Japanese Patent Application No. 2007-058231, filed Mar. 8, 2007, and Japanese Patent Application No. 2007-189428, filed Jul. 20, 2007. The contents of these applications are incorporated herein by reference in their entirety.

BACKGROUND OF THE INVENTION

1. Field of the Invention

The present invention relates to a painting system.

2. Discussion of the Background

WO2001/68267 and WO2005/46880 disclose painting systems in which painting robots and door operating robots are disposed respectively on two travel guide rails that are attached onto side walls of a paint booth at positions vertically different from each other.

In the painting robot disclosed in WO2001/68267, there is placed on a conveyor a vehicle body, which is conveyed into a paint booth. The paint booth has travel guide rails attached onto side walls thereof and mounted on the respective travel guide rails are door operating robots and painting robots that paint the vehicle body. The door operating robots and the painting robots are mounted respectively on the travel guide rails at positions vertically different from each other, so that the door operating robots and the painting robots are movable while crossing without interfering each other. In this conventional system, the painting robots are disposed on the upper travel guide rails while the door operating robots are disposed on the lower travel guide rails.

In the painting robot disclosed in WO2005/46880, a vehicle body is placed on a conveyor and is conveyed into a paint booth. The paint booth has travel guide rails attached onto a side wall thereof, and there are mounted on the respective travel guide rails door operating robots and a painting robot that paints the vehicle body. The door operating robots and the painting robot are mounted respectively on the travel guide rails at positions vertically different from each other, so that the door operating robots and the painting robot are movable while crossing without interfering each other. In this system, the painting robot is disposed on the upper travel guide rail while the door operating robots are disposed on the lower travel guide rail.

SUMMARY OF THE INVENTION

According to one aspect of the present invention, a painting system includes a paint booth, a conveyor, a first travel guide rail, a second travel guide rail, a painting robot, and an opener robot. The conveyor is configured to convey in the paint booth an article to be painted. The first travel guide rail is provided at a side of the conveyor to extend along the conveyor. The second travel guide rail is provided at a side of the conveyor to extend along the conveyor above the first travel guide rail. The painting robot is mounted on the first travel guide rail to be movable along the first travel guide rail. The opener robot is mounted on the second travel guide rail to be movable along the second travel guide rail. The painting robot and the opener robot are movable along the first travel guide rail and the second travel guide rail respectively without interfering with each other.

According to another aspect of the present invention, a painting system includes a paint booth, a conveyor, a first travel guide rail, a second travel guide rail, a painting robot, an opener robot, and a door operating and painting robot. The conveyor is configured to convey in the paint booth an article to be painted. The first travel guide rail is provided at a side of the conveyor to extend along the conveyor. The second travel guide rail is provided at a side of the conveyor to extend along the conveyor above the first travel guide rail. The painting robot is mounted on the first travel guide rail to be movable along the first travel guide rail. The opener robot and the door operating and painting robot are mounted on the second travel guide rail to be movable along the second travel guide rail. The painting robot, the opener robot, and a door operating and painting robot are movable along the first travel guide rail and the second travel guide rail, respectively, without interfering with each other.

According to further aspect of the present invention, a painting system includes a paint booth, a conveyor, a first travel guide rail, a second travel guide rail, a third travel guide rail, a fourth travel guide rail, a first painting robot, a second painting robot, a first door operating and painting robot, and a second door operating and painting robot. An article is to be painted in the paint booth which has one side wall and another side wall facing to the one side wall. The conveyor is configured to convey the article in the paint booth along the one side wall and the another side wall. The first travel guide rail extends along the conveyor and is provided on the one side wall of the paint booth. The second travel guide rail extends along the conveyor and is provided on the one side wall above the first travel guide rail. The third travel guide rail extends along the conveyor and is provided on the another side wall of the paint booth. The fourth travel guide rail extends along the conveyor and is provided on the another side wall above the third travel guide rail. The first painting robot is mounted on the first travel guide rail to be movable along the first travel guide rail. The second painting robot is mounted on the third travel guide rail to face the first painting robot and to be movable along the third travel guide rail. The first door operating and painting robot is mounted on the second travel guide rail to be movable along the second travel guide rail. The second door operating and painting robot is mounted on the fourth travel guide rail to be movable along the fourth travel guide rail. The first door operating and painting robot and the second door operating and painting robot are provided to be in a substantially symmetric position with respect to a center point of the article.

According to the other aspect of the present invention, a painting system includes a paint booth, a conveyor, a first travel guide rail, a second travel guide rail, a third travel guide rail, a fourth travel guide rail, a first painting robot, and a second painting robot. An article is to be painted in the paint booth which has one side wall and another side wall facing to the one side wall. The conveyor is configured to convey the article in the paint booth along the one side wall and the another side wall. The first travel guide rail extends along the conveyor and is provided on the one side wall of the paint booth. The second travel guide rail extends along the conveyor and is provided on the one side wall above the first travel guide rail. The third travel guide rail extends along the conveyor and is provided on the another side wall of the paint booth. The fourth travel guide rail extends along the conveyor and is provided on the another side wall above the third travel guide rail. The first painting robot is mounted on the first travel guide rail to be movable along the first travel guide rail. The second painting robot is mounted on the third travel guide rail to be movable along the third travel guide rail. The first painting robot and the second painting robot are provided to be in a substantially symmetric position with respect to a center point of the article. The first door operating and painting robot is mounted on the second travel guide rail to be movable along the second travel guide rail without interfering with the first painting robot. The second door operating and painting robot is mounted on the fourth travel guide rail to be movable along the fourth travel guide rail. The first door operating and painting robot and the second door operating and painting robot are provided to be in a substantially symmetric position with respect to the center point of the article.

According to yet the other aspect of the present invention, a paint system includes a paint booth, a conveyor, a first travel frame, a first travel guide rail, a second travel frame, a second travel guide rail, a painting robot, and an opener robot. The conveyor is configured to convey in the paint booth an article to be painted. The first travel frame is provided at a side of the conveyor to extend along the conveyor. The first travel guide rail is provided at the first travel frame to extend along the conveyor. The second travel frame is provided at a side of the conveyor to extend along the conveyor. The second travel guide rail is provided at the second travel frame to extend along the conveyor below the first travel guide rail. The painting robot is mounted on the first travel guide rail to be movable along the first travel guide rail. The opener robot is mounted on the second travel guide rail to be movable along the second travel guide rail. The painting robot and the opener robot are movable along the first travel guide rail and the second travel guide rail respectively without interfering with each other.

According to yet the other aspect of the present invention, a painting system includes a paint booth, a conveyor, a travel frame, a travel guide rail, a fixing base, a first rotating base, a second rotating base, an upper painting robot, and a lower painting robot. The conveyor is configured to convey in the paint booth an article to be painted. The travel frame is provided at a side of the conveyor to extend along the conveyor. The travel guide rail is provided at the travel frame to extend along the conveyor. The fixing base is connected to the travel guide rail. The first rotating base is substantially vertically rotatably provided below the fixing base. The second rotating base is substantially vertically rotatably provided above the fixing base. The upper painting robot is mounted on the travel guide rail to be movable along the travel guide rail and includes at least one first arm connected to the first rotating base and is substantially horizontally rotatable. The lower painting robot is mounted on the travel guide rail to be movable along the travel guide rail and includes at least one second arm connected to the second rotating base and is substantially horizontally rotatable.

According to yet the other aspect of the present invention, a painting system includes a paint booth, a conveyor, a travel frame, a travel guide rail, a trunk opener robot, and a trunk painting robot. The conveyor is configured to convey in the paint booth an article to be painted. The travel frame is provided at a side of the conveyor to extend along the conveyor. The travel guide rail is provided at the travel frame to extend along the conveyor. The trunk opener robot is mounted on the travel guide rail to be movable along the travel guide rail. The trunk painting robot is mounted on the travel guide rail to be movable along the travel guide rail and configured to open and close a door. The trunk opener robot and the trunk painting robot maintain a substantially symmetric position with respect to a center point of the article.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

Figure 1:
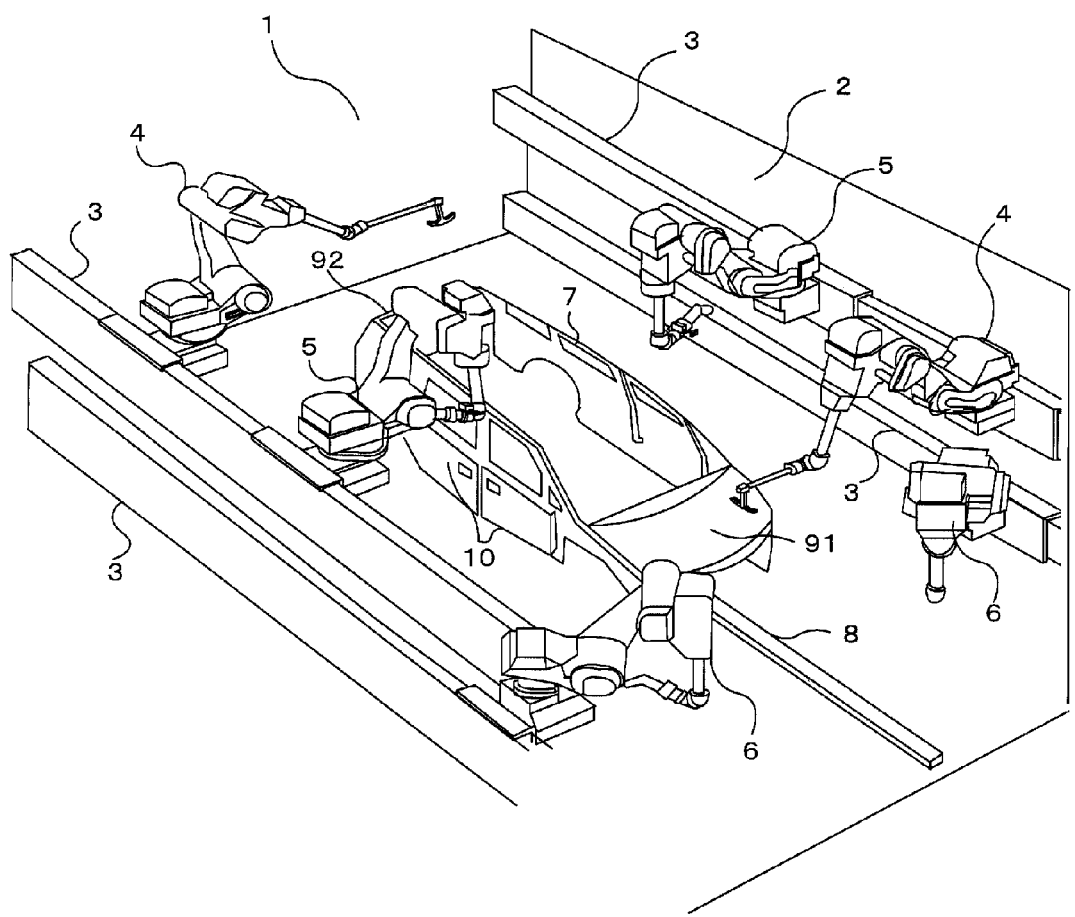
FIG. 1 is a perspective view of a painting system according to first embodiment of the present invention.

Embodiments will now be described with reference to the accompanying drawings, wherein like reference numerals designate corresponding or identical elements throughout the various drawings.

First Embodiment

FIG. 1 is a perspective view of a painting system according to First Embodiment of the present invention. FIG. 1 shows a painting system 1, a paint booth 2, travel guide rails 3, trunk openers 4, door operating and painting robots 5, trunk painting robots 6, a vehicle body 7, and a conveyor line 8.

First Embodiment of the present invention differs from the conventional examples in the following points: the trunk openers 4 are disposed on the upper travel guide rails 3 and the trunk painting robots 6 are disposed on the lower travel guide rails 3; the trunk painting robots 6 as well as the door operating and painting robots 5 are disposed to face each other so as to allow the vehicle body 7 to travel therebetween; and the trunk openers 4 are disposed symmetrically with respect to a center point of the vehicle body 7.

Figure 2:
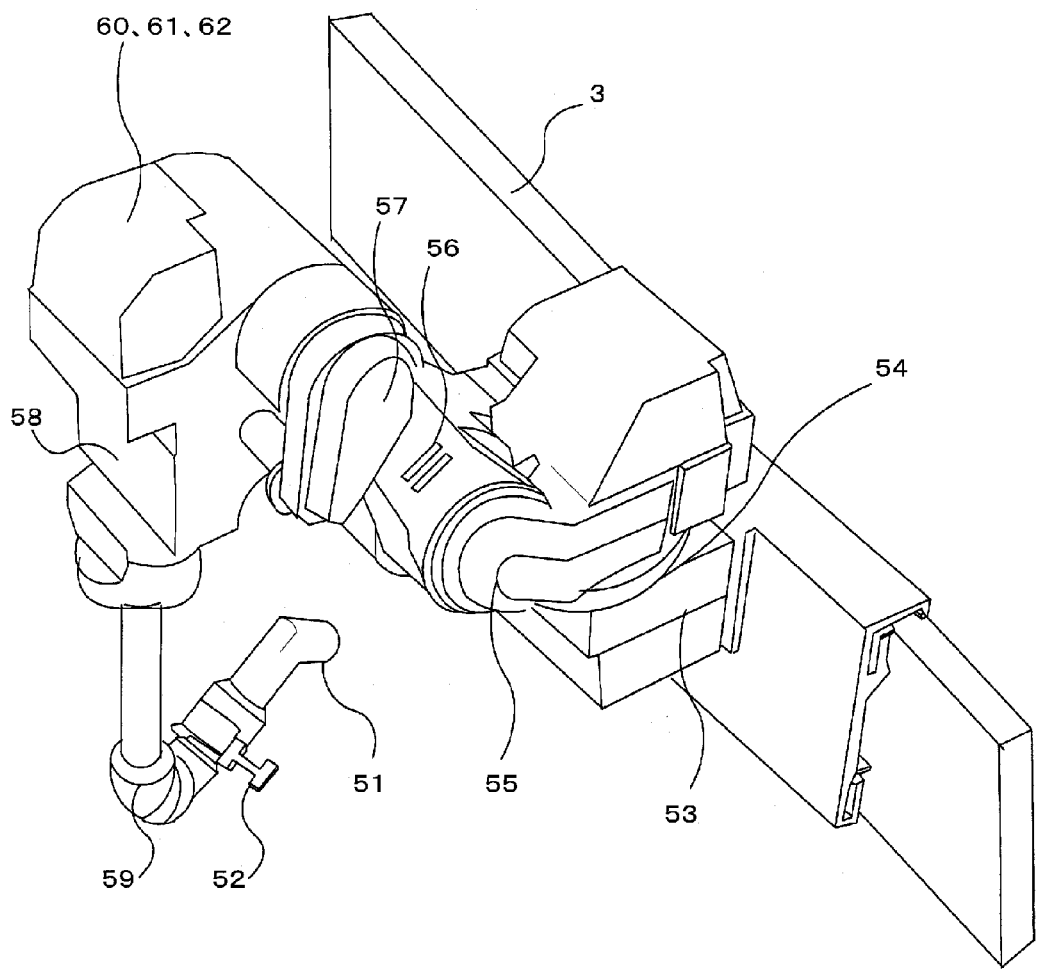
FIG. 2 is a perspective view of a door operating and painting robot according to first embodiment of the present invention.
Figure 3:
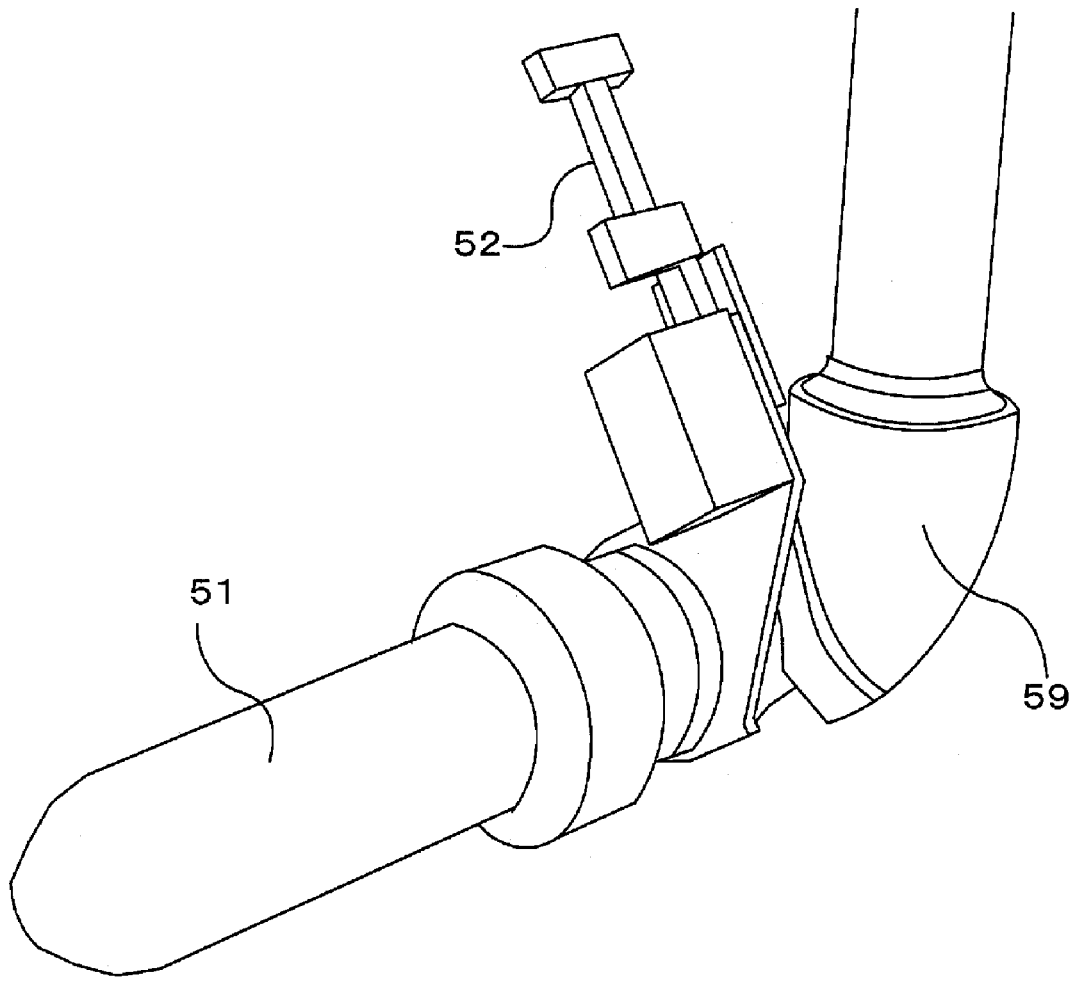
FIG. 3 is a perspective view of a wrist of the door operating and painting robot according to first embodiment of the present invention.

In the painting system 1 according to First Embodiment of the present invention, the vehicle body 7 is placed on the conveyor line 8, and the upper and lower travel guide rails 3 are attached onto each of side walls of the paint booth 2 along the traveling direction of the vehicle body 7. The trunk opener 4 and the door operating and painting robot 5 are disposed slidably on the upper travel guide rail 3 on one of the side walls of the paint booth 2, while the trunk painting robot 6 is disposed on the lower travel guide rail 3. Same types of robots are disposed also on the respective upper and lower travel guide rails 3 on the other side wall of the paint booth 2. On the upper travel guide rails 3 on the respective side walls, the door operating and painting robots 5 are disposed to face each other, while the trunk openers 4 are disposed next to the door operating and painting robots 5 so as to be symmetric with respect to the center point of the vehicle body 7. The trunk painting robots 6 are disposed to face each other respectively on the lower travel guide rails 3 on the side walls. Each of these robots is mounted on the corresponding travel guide rail 3 via a fixing base. Since each of the robots is similarly configured, the door operating and painting robot 5 is exemplified with reference to FIG. 2. The door operating and painting robot 5 is mounted on the corresponding travel guide rail 3 with a fixing base 53 interposed therebetween. The door operating and painting robot 5 is provided with a lower arm 56 and an upper arm 58. The lower arm 56 pivots with respect to a first axis 54 that is rotated in a horizontal plane of the fixing base 53 as well as to a second axis 55 that is rotatable perpendicularly to the first axis 54. The upper arm 58 is attached to the distal end of the lower arm 56 and pivots with respect to a third axis 57 that is rotatable perpendicularly to the first axis 54. The upper arm 58 is provided with a distal wrist 59 that is made rotatable by fourth to sixth axes 60, 61 and 62, and the wrist 59 has a painting gun 51 and an opening/closing device 52. As shown in FIG. 3, the wrist 59 of the door operating and painting robot 5 has the opening/closing device 52 provided with a hook, as well as the painting gun 51 attached to the distal end thereof. Such a configuration inhibits paint sprayed by the painting gun 51 from adhering to the opening/closing device 52.

Described below is a process of painting the vehicle body 7 provided with four doors. To begin with, the two trunk openers 4 respectively open an engine trunk 91 in a front part of the vehicle body 7 in the traveling direction and a rear trunk 92 in a rear part thereof, while the two door operating and painting robots 5 respectively open front doors 10 of the vehicle body 7.

The two trunk painting robots 6 then paint inner surfaces of the engine trunk 91 while being relatively positioned to face each other. The two door operating and painting robots 5 also paint respective inner surfaces of the front doors 10 while being relatively positioned to face each other.

The two door operating and painting robots 5 close the front doors 10, and the corresponding trunk opener 4 closes the engine trunk 91.

Thereafter, the two trunk painting robots 6 are moved to positions for painting the rear trunk 92 while being relatively positioned to face each other. As the door operating and painting robots 5 and the trunk painting robots 6 are disposed to be movable without interfering each other, the trunk painting robots 6 are capable of passing below the respective door operating and painting robots 5.

The two trunk painting robots 6 then paint inner surfaces of the rear trunk 92 while being relatively positioned to face each other. The two door operating and painting robots 5 also paint inner surfaces of the respective rear doors 10 while being relatively positioned to face each other.

Lastly, the two door operating and painting robots 5 close the rear doors 10, and the corresponding trunk opener 4 closes the rear trunk 92. Upon completion of the painting process, the robots respectively return to the initial positions.

The respective robots, of which positions are each detected by a control device (not shown), are moved along the corresponding travel guide rails 3 to reach painting positions or door operating positions in synchronization with the movement of the conveyor line 8 that moves the vehicle body 7.

Second Embodiment

Figure 4:
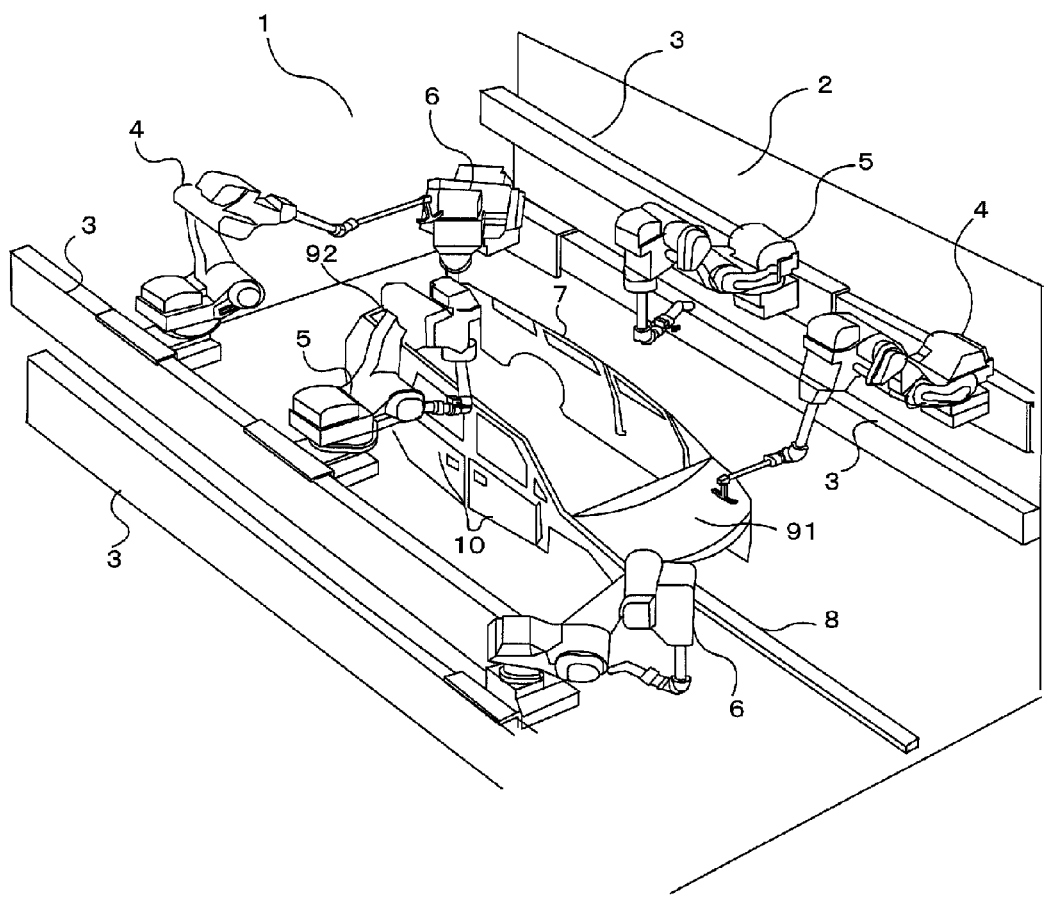
FIG. 4 is a perspective view of a painting system according to second embodiment of the present invention.

FIG. 4 is a perspective view of a painting system according to Second Embodiment. Described below are differences from First Embodiment. Second Embodiment differs from First Embodiment in that the two trunk painting robots 6, which are respectively disposed on the lower travel guide rails 3 on the respective side walls of the paint booth 2, are made symmetric with respect to the center point of the vehicle body 7. The remaining arrangements in the painting system 1 are similar to those of First Embodiment, and thus description thereof will not be repeated.

Described below is a process of painting the vehicle body 7 provided with four doors. To begin with, the two trunk openers 4 respectively open the engine trunk 91 in the front part of the vehicle body 7 in the traveling direction and the rear trunk 92 in the rear part thereof, while the two door operating and painting robots 5 respectively open the front doors 10 of the vehicle body 7.

The two trunk painting robots 6 then respectively paint inner surfaces of half the engine trunk 91 and half the rear trunk 92 while being relatively positioned symmetrically with respect to the center point of the vehicle body 7. The two door operating and painting robots 5 paint respective inner surfaces of the front doors 10 while being relatively positioned to face each other.

The two door operating and painting robots 5 close the front doors 10.

Thereafter, the two trunk painting robots 6 are moved to positions for painting the engine trunk 91 and the rear trunk 92 while being relatively positioned symmetrically with respect to the center point of the vehicle body 7. As the door operating and painting robots 5 and the trunk painting robots 6 are disposed to be movable without interfering each other, the trunk painting robots 6 are capable of passing below the respective door operating and painting robots 5.

The two trunk painting robots 6 then respectively paint inner surfaces of the remaining half of the engine trunk 91 and the remaining half of the rear trunk 92 while being relatively positioned symmetrically with respect to the center point of the vehicle body 7. The two door operating and painting robots 5 also paint inner surfaces of the respective rear doors 10 while being relatively positioned to face each other.

Lastly, the two door operating and painting robots 5 close the rear doors 10, and the trunk openers 4 respectively close the engine trunk 91 and the rear trunk 92. Upon completion of the painting process, the robots respectively return to the initial positions.

The respective robots, of which positions are each detected by a control device (not shown), are moved along the corresponding travel guide rails 3 to reach painting positions or door operating positions in synchronization with the movement of the conveyor line 8 that moves the vehicle body 7.

Third Embodiment

Figure 5:
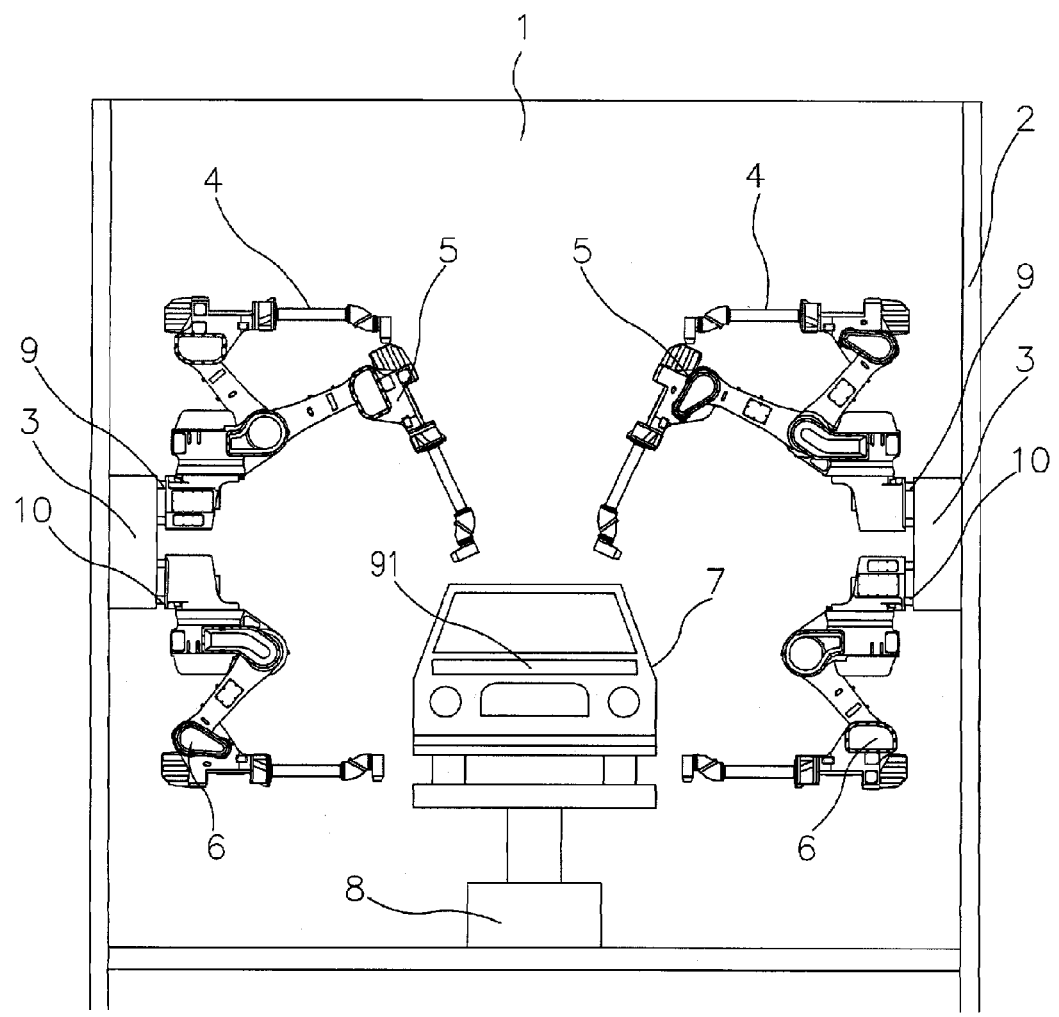
FIG. 5 is a front view of a painting system according to third embodiment of the present invention.
Figure 6:
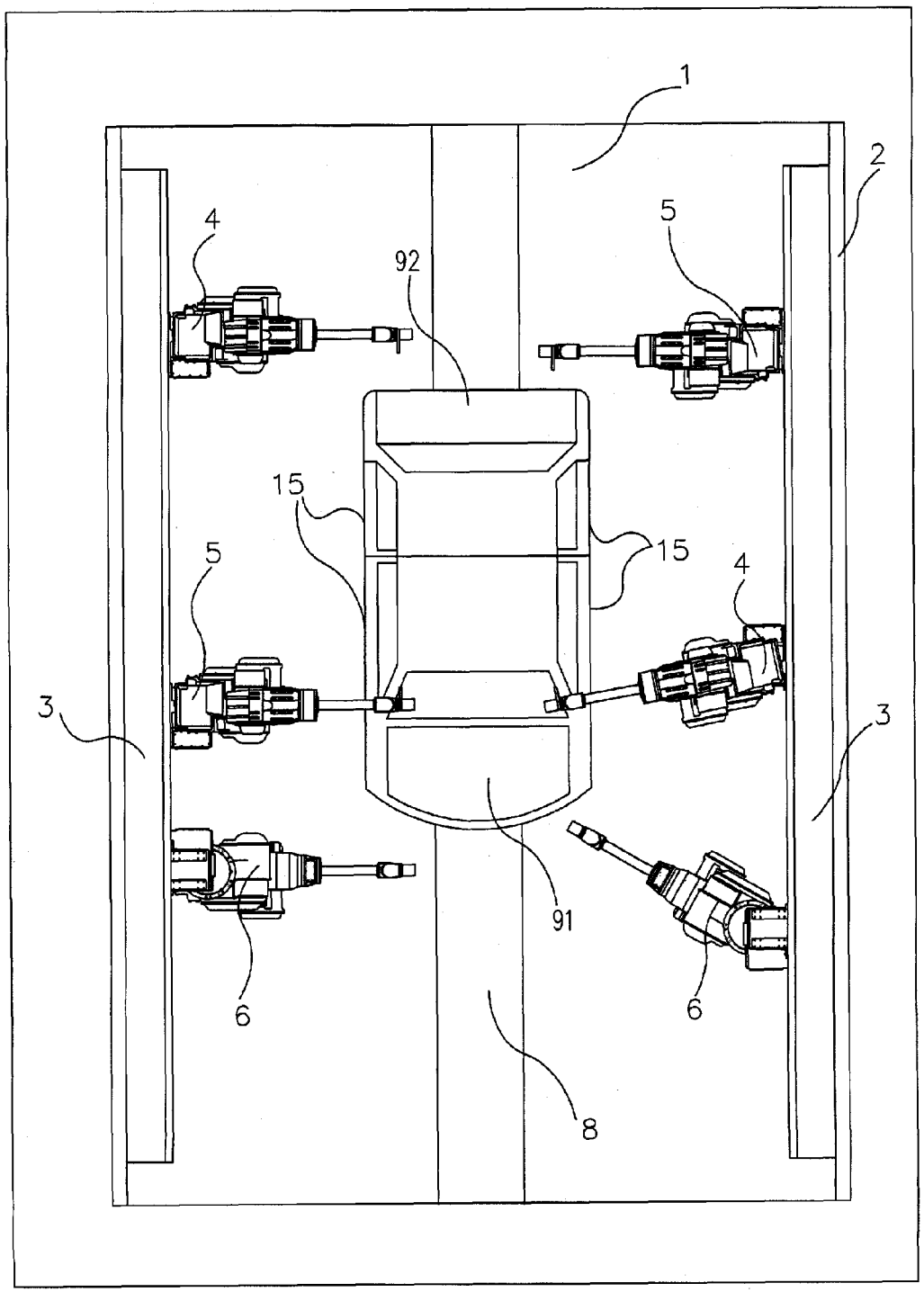
FIG. 6 is a top plan view of the painting system according to third embodiment of the present invention.

FIG. 5 is a front view of a painting system according to Third Embodiment, and FIG. 6 is atop plan view of the painting system according to Third Embodiment. These drawings show a painting system 1, a paint booth 2, travel frames 3, travel guide rails 9 and 10, trunk openers 4, door operating and painting robots 5, trunk painting robots 6, a vehicle body 7, and a conveyor line 8.

Third Embodiment differs from First and Second Embodiments in the following points: the travel frames 3 are attached respectively onto upper parts of walls of the paint booth 2, and the travel guide rails 9 and 10 are provided respectively at upper and lower parts of each of the travel frames 3; the trunk openers 4 are disposed respectively on the upper travel guide rails 9, while the trunk painting robots 6 are disposed respectively on the lower travel guide rails 10; the trunk painting robots 6 as well as the door operating and painting robots 5 are disposed to face each other on the respective sides of the vehicle body 7 in the traveling direction thereof, while the trunk openers 4 are disposed symmetrically with respect to the center point of the vehicle body 7; and none of the trunk openers 4, the door operating and painting robots 5, and the trunk painting robots 6 are provided in the vicinity of a floor 2a of the paint booth 2.

In the painting system 1 according to Third Embodiment, the vehicle body 7 is placed on the conveyor line 8, and the travel frames 3 are attached onto the upper parts (above half the height of the painting target) of the respective side walls of the paint booth 2 along the traveling direction of the vehicle body 7. The travel guide rails 9 are provided respectively at the upper parts of the travel frames 3, and the trunk openers 4 as well as the door operating and painting robots 5 are disposed to be movable along the respective travel guide rails 9 with the arms thereof extending upwards. Disposed on the respective lower travel guide rails 10 are the trunk painting robots 6 with the arms thereof extending downwards.

The travel guide rails 9 and 10 are similarly provided on the travel frame 3 on the opposite side wall of the paint booth 2. The trunk opener 4 and the door operating and painting robot 5 are slidably disposed on the travel guide rail 9 with the arms thereof extending upwards. Disposed on the lower travel guide rails 10 is the trunk painting robot 6 with the arm thereof extending downwards. At the upper parts of the travel frames 3, the door operating and painting robots 5 are disposed to face each other, while the trunk openers 4 are respectively disposed next to the door operating and painting robots 5 so as to be symmetric with respect to the center point of the vehicle body 7. At the lower parts of the travel frames 3 attached onto the respective side walls, the trunk painting robots 6 are disposed to face each other.

Since the respective robots are configured similarly to those of First and Second Embodiments, description on these robots is not repeated.

Described below is a process of painting the vehicle body 7 provided with four doors. To begin with, the two trunk openers 4 respectively open an engine trunk 91 in a front part of the vehicle body 7 in the traveling direction and a rear trunk 92 in a rear part thereof, while the two door operating and painting robots 5 respectively open front doors 15 of the vehicle body 7.

The two trunk painting robots 6 then paint inner surfaces of the engine trunk 91 while being relatively positioned to face each other. The two door operating and painting robots 5 also paint respective inner surfaces of the front doors 15 while being relatively positioned to face each other.

The two door operating and painting robots 5 close the front doors 15, and the corresponding trunk opener 4 closes the engine trunk 91.

Thereafter, the two trunk painting robots 6 are moved to positions for painting the rear trunk 92 while being relatively positioned to face each other. As the door operating and painting robots 5 and the trunk painting robots 6 are disposed to be movable without interfering each other, the trunk painting robots 6 are capable of passing below the respective door operating and painting robots 5.

The two trunk painting robots 6 then paint inner surfaces of the rear trunk 92 while being relatively positioned to face each other. The two door operating and painting robots 5 also paint inner surfaces of the respective rear doors 15 while being relatively positioned to face each other.

Lastly, the two door operating and painting robots 5 close the rear doors 15, and the corresponding trunk opener 4 closes the rear trunk 92. Upon completion of the painting process, the robots respectively return to the initial positions.

The respective robots, of which positions are each detected by a control device (not shown), are moved along the corresponding travel guide rails 9 or 10 to reach painting positions or door operating positions in synchronization with the movement of the conveyor line 8 that moves the vehicle body 7.

Fourth Embodiment

Figure 7:
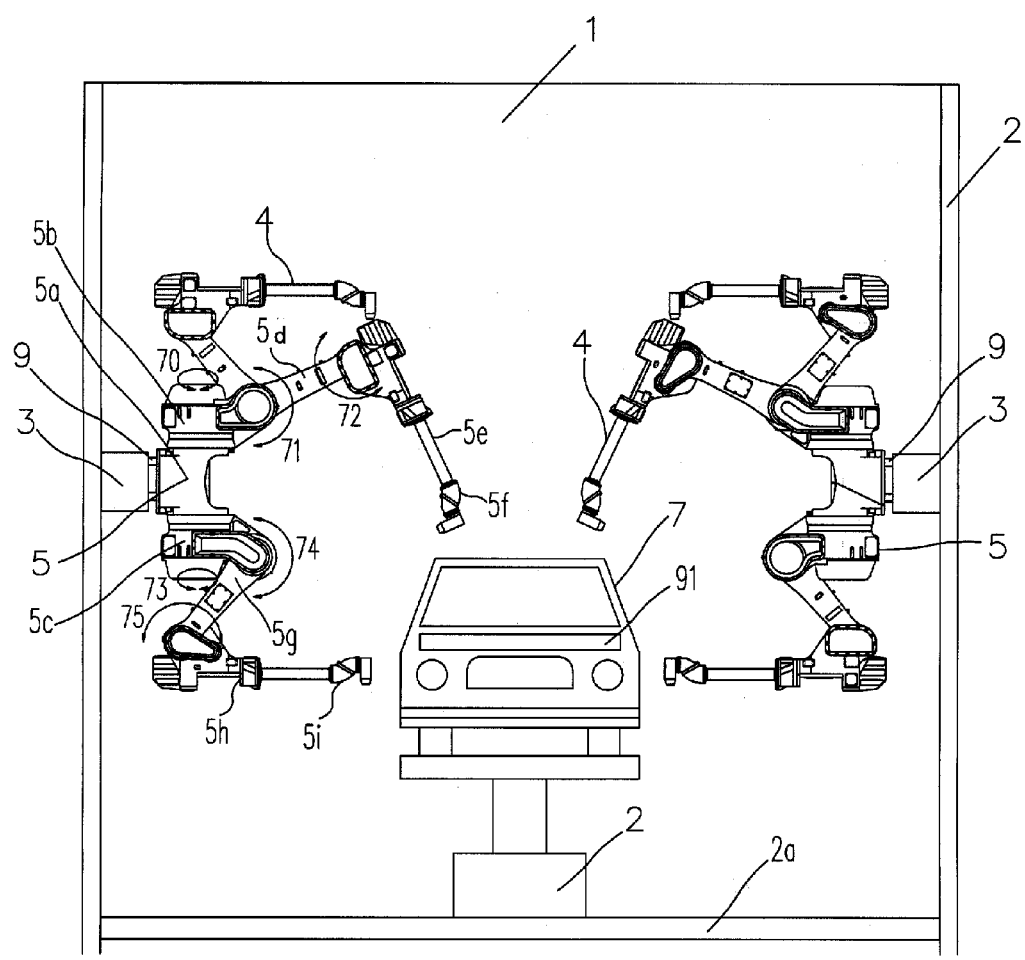
FIG. 7 is a front view of a painting system according to fourth embodiment of the present invention.
Figure 8:
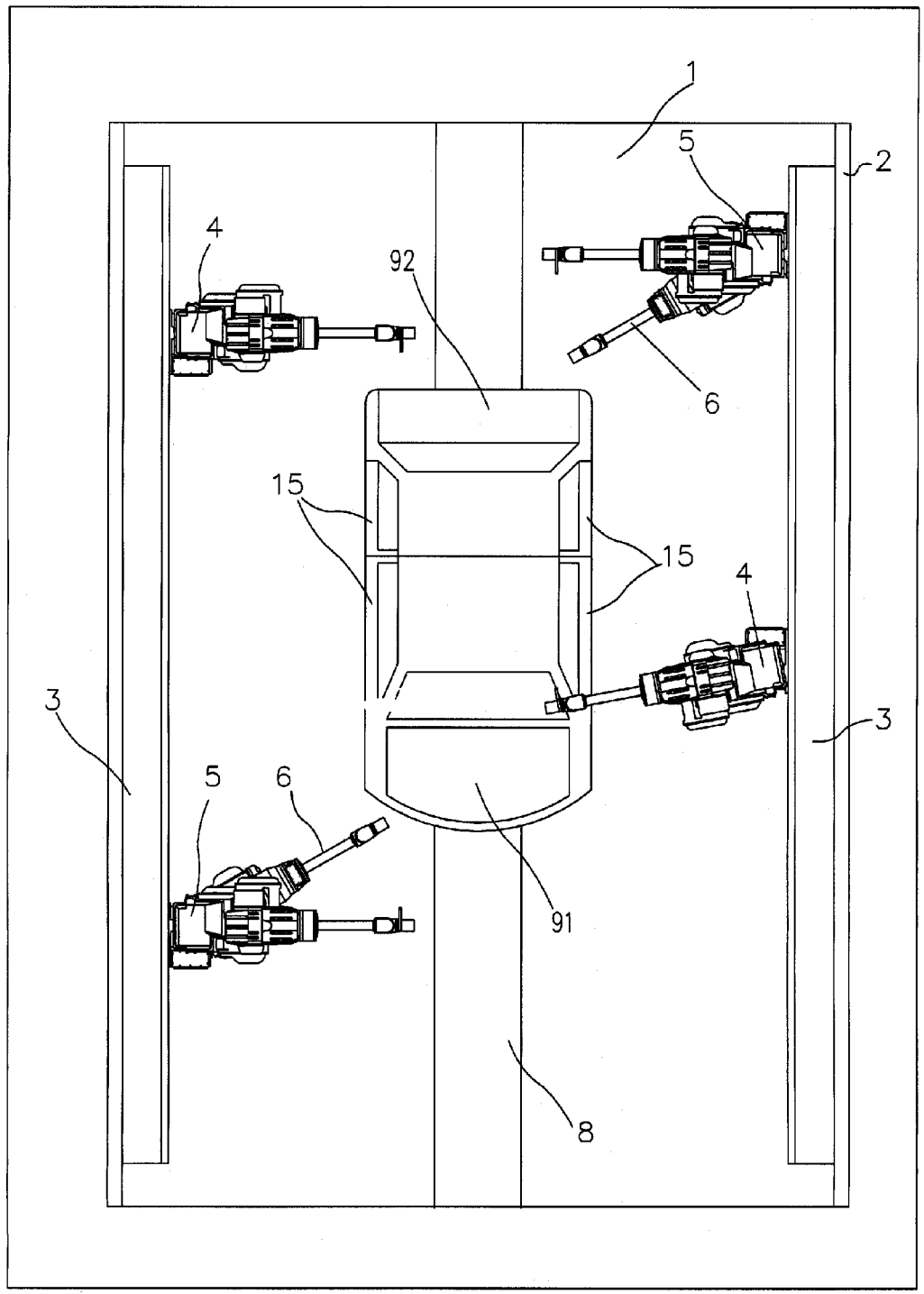
FIG. 8 is a top plan view of the painting system according to fourth embodiment of the present invention.

FIG. 7 is a front view of a painting system according to Fourth Embodiment. FIG. 8 is a top plan view of the painting system according to Fourth Embodiment. These drawings show a painting system 1, a paint booth 2, travel frames 3, travel guide rails 9, trunk openers 4, door operating and painting/trunk painting robots 5, a vehicle body 7, and a conveyor line 8.

Fourth Embodiment differs from First to Third Embodiments in the following points: the travel frames 3 are attached respectively onto upper parts of side walls of the paint booth 2, and the travel guide rails 9 are provided respectively on the travel frames 3; disposed on the travel guide rails 9 are the trunk openers 4 and the door operating and painting/trunk painting robots 5; the trunk openers 4 as well as the door operating and painting/trunk painting robots 5 are disposed on respective sides of the vehicle body 7 in the traveling direction thereof so as to be respectively symmetric with respect to the center point of the vehicle body 7; and none of the trunk openers 4 and the door operating and painting/trunk painting robots 5 are provided in the vicinity of a floor 2a of the paint booth 2.

In the painting system 1 according to Fourth Embodiment, the vehicle body 7 is placed on the conveyor line 8, and the travel frames 3 are attached onto upper parts (above half the height of the painting target) of the respective side walls of the paint booth 2 in the traveling direction of the vehicle body 7. The travel frames 3 are respectively provided with the travel guide rails 9, on which the trunk openers 4 and the door operating and painting/trunk painting robots 5 are moveably disposed.

The travel guide rail 9 is similarly provided on the travel frame 3 on the opposite side wall of the paint booth 2, and the trunk opener 4 as well as the door operating and painting/trunk painting robot 5 are disposed to be slidable along the travel guide rail 9. On the travel frames 3, the trunk openers 4 as well as the door operating and painting/trunk painting robots 5 are disposed symmetrically with respect to the center point of the vehicle body 7.

The trunk openers 4 are each mounted on the corresponding travel guide rail 9 that is provided on the travel frame 3 with a fixing base interposed therebetween. As the respective robots are configured similarly to those of First and Second Embodiments, description on these robots is not repeated.

Each of the door operating and painting/trunk painting robots 5 is mounted on the corresponding travel guide rail 9 with a fixing base 5a interposed therebetween, and attached to the fixing base 5a is a first pivoting base 5b that is pivotable about an vertically upward first axis 70. The first pivoting base 5b is connected to a first end of a first arm 5d that is pivotable about a horizontal second axis 71, and connected to a second end of the first arm 5d is a first end of a second arm 5e that is pivotable about a third axis 72 provided in parallel with the second axis 71. Connected to a second end of the second arm 5e is a first wrist 5f (fourth to sixth axes not shown), and there is thus configured a door operating and painting robot 5X. There is also attached to the fixing base 5a a second pivoting base 5c that is pivotable about a vertically upward seventh axis 73. The second pivoting base 5c is connected to a first end of a third arm 5g that is pivotable about a horizontal eighth axis 74, and a second end of the third arm 5g is connected to a first end of a fourth arm 5h that is pivotable about a ninth axis 75 provided in parallel with the eighth axis 74. Connected to a second end of the fourth arm 5h is a second wrist 5i (tenth to twelfth axes not shown), and there is thus configured a trunk painting robot 5Y. As shown in FIG. 3, each of the wrists has an opening/closing device 52 provided with a hook, as well as a painting gun 51 attached to the distal end thereof.

Described below is a process of painting the vehicle body 7 provided with four doors. To begin with, the two trunk openers 4 respectively open an engine trunk 91 in a front part of the vehicle body 7 in the traveling direction and a rear trunk 92 in a rear part thereof, while the two door operating and painting robots 5X respectively open front doors 15 of the vehicle body 7.

The two trunk painting robots 5Y then paint inner surfaces of the engine trunk 91 and the rear trunk 92 while being relatively positioned symmetrically with respect to the center point of the vehicle body 7. The two door operating and painting robots 5X also paint respective inner surfaces of the front doors 15 while being relatively positioned to face each other.

The two door operating and painting robots 5X close the front doors 15, and the two trunk openers 4 close the engine trunk 91 and the rear trunk 92, respectively.

Thereafter, the two door operating and painting robots 5X open the rear doors 15 of the vehicle body 7 while being relatively positioned to face each other, and paint inner surfaces of the rear doors 15.

Lastly, the two door operating and painting robots 5X close the rear doors 15. Upon completion of the painting process, the robots respectively return to the initial positions.

The respective robots, of which positions are each detected by a control device (not shown), are moved along the corresponding travel guide rails 9 to reach painting positions or door operating positions in synchronization with the movement of the conveyor line 8 that moves the vehicle body 7.

As described above, the painting robots as well as the trunk openers are disposed symmetrically with respect to the center point of the vehicle body. However, these robots are not required to be strictly symmetric with respect to the point, but are required only to be substantially symmetric with respect to the point such that the robots are disposed on opposite sides of the respective ends of the vehicle body, like the positional relation between the engine trunk and the rear trunk in the vehicle body.

Although the present invention has referred mainly to painting inner surfaces of a vehicle body, the present invention is obviously applicable to painting outer surfaces of the vehicle body.

An embodiment of the present invention provides a painting system that includes robots of the optimized number disposed at optimized positions in a paint booth, so as to improve productivity thereof.

In accordance with an embodiment of the present invention exerts the following effects.

Firstly, due to the robots of the optimized number being disposed at optimized positions, the paint booth as well as the air conditioning facility can be reduced in size.

The opener robot and the door operating and painting robot are disposed on the upper travel guide rail while the painting robot is disposed on the lower travel guide rail. In this configuration, even when the downward flow of air is provided in the paint booth, no paint is applied to the opening/closing device that opens and closes the trunks and the doors, thereby causing no adhesion of paint to another goods in a different color. As a result, continuous painting onto targets is realized with no maintenance work being required.

The door operating and painting robot is disposed on the upper guide rail while the painting robot is disposed on the lower guide rail. In this configuration, the doors and the trunks are painted using the plurality of robots, thereby realizing reduction in painting time. Further, the number of robots can be reduced by provision of the door operating and painting robot, which has both the door operating function and the painting function.

The painting robots, the door operating and painting robots, and the opener robots are respectively disposed on the corresponding travel guide rails attached onto the respective side walls of the paint booth so as to face each other or to be symmetric with respect to the point where the painting target is placed. As the respective robots disposed to face each other or to be symmetric with respect to the point synchronously operate, painting time can be reduced.

After the door operating and painting robot completes painting the door, the painting robot passes below the door operating and painting robot to paint the trunk. In such a configuration, painting sequences are optimized and thus reduced is time for painting the target.

In accordance with an embodiment of the present invention exerts the following effects.

Disposition of the painting robot above the painting target realizes reduction in width of the paint booth as well as reduction in size of the air conditioning facility. Moreover, disposition of the door operating robot and the painting robot above the corresponding travel guide rails decreases the volume of paint adhering to the traveling device as well as to the painting robot, resulting in improvement in painting quality.

In accordance with an embodiment of the present invention exerts the following effects.

Disposition of the painting robot above the painting target realizes reduction in width of the paint booth as well as reduction in size of the air conditioning facility. Furthermore, as the six-axis multiple joint robots are provided on and under the base mounted on the traveling device, reduced is the required height of the paint booth. Disposition of the painting robot above the travel guide rail decreases the volume of paint adhering to the traveling device as well as to the painting robot, thereby realizing improvement in painting quality.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A painting system comprising:
    a paint booth;
    a conveyor configured to convey in the paint booth a vehicle body to be painted;
    a first travel guide rail provided at a side of the conveyor to extend along the conveyor;
    a second travel guide rail provided at the side of the conveyor to extend along the conveyor above the first travel guide rail;
    a painting robot configured to paint a lid member provided in at least one of front and rear parts of the vehicle body and mounted on the first travel guide rail to be movable along the first travel guide rail;
    an opener robot configured to open and close the lid member and mounted on the second travel guide rail to be movable along the second travel guide rail;
    a door operating and painting robot configured to open and close a door of the vehicle body and configured to paint an inner surface of the door, the door operating and painting robot being mounted on the second travel guide rail to be movable along the second travel guide rail; and
    the painting robot, the opener robot, and the door operating and painting robot being movable along the first travel guide rail and the second travel guide rail, respectively, without interfering with each other.

2. The painting system according to claim 1, wherein the door operating and painting robot includes at a distal end thereof a wrist axis that has a painting gun and a door opening/closing device so as to be operable with multiple degrees of freedom.

3. The painting system according to claim 1,
wherein the paint booth includes a side wall,
wherein the first travel guide rail is attached to the side wall,
wherein the second travel guide rail is attached to the side wall, and
wherein the opener robot and the door operating and painting robot being provided to pass above the painting robot.

4. The painting system according to claim 1, further comprising:
a third travel guide rail provided at an opposite side of the conveyor to extend along the conveyor;
a fourth travel guide rail provided at the opposite side of the conveyor to extend along the conveyor above the third travel guide rail;
another painting robot configured to paint the lid member and mounted on the third travel guide rail to be movable along the third travel guide rail;
another opener robot configured to open and close the lid member and mounted on the fourth travel guide rail to be movable along the fourth travel guide rail;
another door operating and painting robot configured to open and close the door of the vehicle body and configured to paint the inner surface of the door, the another door operating and painting robot being mounted on the fourth travel guide rail to be movable along the fourth travel guide rail; and
the another painting robot, the another opener robot, and the another door operating and painting robot being movable along the third travel guide rail and the fourth travel guide rail, respectively, without interfering with each other.

5. The painting system according to claim 4,
wherein the paint booth includes a side wall provided on the side of the conveyor, and another side wall provided on the opposite side of the conveyor,
wherein the first travel guide rail is attached to the side wall,
wherein the second travel guide rail is attached to the side wall,
wherein the third travel guide rail is attached to the another side wall, and
wherein the fourth travel guide rail is attached to the another side wall.

* * * * *